US012707286B2

(12) United States Patent
Luthra et al.

(10) Patent No.: US 12,707,286 B2
(45) Date of Patent: Aug. 11, 2026

(54) SYSTEM AND METHOD FOR O-CLOUD NODE RECONFIGURATION IN A TELECOMMUNICATIONS SYSTEM

(71) Applicants: RAKUTEN MOBILE, INC., Tokyo (JP); Rakuten Symphony, Inc., Tokyo (JP)

(72) Inventors: Mohit Luthra, Singapore (SG); Awn Muhammad, Tokyo (JP); Pankaj Shete, Tokyo (JP); Puneet Devadiga, Singapore (SG)

(73) Assignees: RAKUTEN MOBILE, INC., Tokyo (JP); RAKUTEN SYMPHONY, INC., Tokyo (JP)

( * ) Notice: Subject to any disclaimer, the term of this patent is extended or adjusted under 35 U.S.C. 154(b) by 125 days.

(21) Appl. No.: 18/012,416

(22) PCT Filed: Nov. 9, 2022

(86) PCT No.: PCT/US2022/049343

§ 371 (c)(1),
(2) Date: Dec. 22, 2022

(87) PCT Pub. No.: WO2024/043917

PCT Pub. Date: Feb. 29, 2024

(65) Prior Publication Data

US 2024/0251254 A1 Jul. 25, 2024

(30) Foreign Application Priority Data

Aug. 25, 2022 (SG) .......................... 10202250827N

(51) Int. Cl.
*H04W 24/02* (2009.01)
*H04L 41/0816* (2022.01)
(Continued)

(52) U.S. Cl.
CPC ......... *H04W 24/02* (2013.01); *H04L 41/0816* (2013.01); *H04L 41/082* (2013.01);
(Continued)

(58) Field of Classification Search
CPC .... H04W 24/02; H04W 4/50; H04L 41/0816; H04L 41/0823; H04L 41/082;
(Continued)

(56) References Cited

U.S. PATENT DOCUMENTS 9,424,070 B2 * 8/2016 Hutton .................... G06F 9/466
2018/0309623 A1 * 10/2018 Szobi .................. H04L 41/0869
(Continued)

OTHER PUBLICATIONS

O-RAN Alliance, O-RAN O2 Interface General Aspects and Principles, O-RAN.WG6.O2-GA&P-v01.02 Technical Specification, Mar. 2022, O-RAN Alliance e.V, pp. 1-42. (Year: 2022).*
(Continued)

*Primary Examiner* — Gregory Todd
(74) *Attorney, Agent, or Firm* — Sughrue Mion, PLLC

(57) ABSTRACT

A system for implementing a reconfiguration of one or more open cloud (O-Cloud) nodes within a O-Cloud infrastructure of a telecommunications network. The system includes a memory storing instructions; and a processor configured to execute the instructions to: obtain, by a federated O-Cloud orchestration and management (FOCOM) within the service management orchestration (SMO) framework, a request to reconfigure a O-Cloud node hosting at least one network function; send, by the FOCOM, a reconfiguration request for the O-Cloud node to the O-Cloud infrastructure via an O2 interface to an infrastructure management services (IMS); receive, by the IMS, the reconfiguration request for the O-Cloud node via the O2 interface, and control to implement the reconfiguration of the O-Cloud node; and upon implementation of the reconfiguration, send, by the IMS, a con-
(Continued)

firmation of the reconfiguration implementation to the FOCOM within SMO via the O2 interface.

18 Claims, 6 Drawing Sheets

(51) Int. Cl.

| | |
|---|---|
| ***H04L 41/082*** | (2022.01) |
| ***H04L 41/0823*** | (2022.01) |
| ***H04L 41/0859*** | (2022.01) |
| ***H04L 41/0869*** | (2022.01) |
| ***H04L 41/0873*** | (2022.01) |
| ***H04L 41/0895*** | (2022.01) |
| ***H04W 4/50*** | (2018.01) |

(52) U.S. Cl.

CPC ...... *H04L 41/0823* (2013.01); *H04L 41/0859* (2013.01); *H04L 41/0863* (2013.01); *H04L 41/0869* (2013.01); *H04L 41/0873* (2013.01); *H04L 41/0895* (2022.05); *H04W 4/50* (2018.02)

(58) Field of Classification Search

CPC ............. H04L 41/0859; H04L 41/0863; H04L 41/0869; H04L 41/0873; H04L 41/0895

See application file for complete search history.

(56) References Cited

U.S. PATENT DOCUMENTS

| | | | | |
|---|---|---|---|---|
| 2021/0258866 | A1* | 8/2021 | Chou | H04W 48/16 |
| 2024/0040522 | A1* | 2/2024 | Zhang | H04L 5/0048 |
| 2024/0163649 | A1* | 5/2024 | Akman | H04W 24/04 |
| 2024/0179079 | A1* | 5/2024 | Mullally | H04L 41/5054 |
| 2024/0251254 | A1* | 7/2024 | Luthra | H04L 41/0816 |
| 2025/0365324 | A1* | 11/2025 | Zhang | H04W 72/044 |

OTHER PUBLICATIONS

International Search Report issued Apr. 6, 2023 in Application No. PCT/US2022/049343.

Written Opinion issued Apr. 6, 2023 in Application No. PCT/US2022/049343.

O-RAN Alliance, "Cloudification and Orchestration Use Cases and Requirements for O-RAN Virtualized RAN", O-RAN.WG6.ORCH-USE-CASES-v04.00, Technical Specification, pp. 1-117 (117 pages).

* cited by examiner

SYSTEM AND METHOD FOR O-CLOUD NODE RECONFIGURATION IN A TELECOMMUNICATIONS SYSTEM

CROSS-REFERENCE TO RELATED APPLICATION(S)

This application is a National Stage of International Application No. PCT/US2022/049343 filed Nov. 9, 2022, claiming priority based on Singapore Provisional Patent Application No. 10202250827N, filed at the Singaporean Patent Office on Aug. 25, 2022, the disclosure of which is incorporated by reference herein in its entirety.

TECHNICAL FIELD

Systems and methods consistent with example embodiments of the present disclosure relate to providing a procedure for the reconfiguration of one or more open cloud (O-Cloud) nodes within a O-Cloud infrastructure of a telecommunications network.

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul to a DU. Because these entities have open protocols and interfaces between them, they can be developed by different vendors.

FIG. 1 illustrates a related art O-RAN architecture. Referring to FIG. 1, RAN functions in the O-RAN architecture are controlled and optimized by a RAN Intelligent Controller (RIC). The RIC is a software-defined component that implements modular applications to facilitate the multivendor operability required in the O-RAN system, as well as to automate and optimize RAN operations. The RIC is divided into two types: a non-real-time RIC (NRT-RIC) and a near-real-time RIC (nRT-RIC).

The NRT-RIC is the control point of a non-real-time control loop and operates on a timescale greater than 1 second within the Service Management and Orchestration (SMO) framework. Its functionalities are implemented through modular applications called rApps. The functionalities include: providing policy (i.e., a set of rules that are used to manage and control the changing and/or maintaining of the state of one or more managed objects) based on guidance and enrichment across the A1 interface, which is the interface that enables the communication between the NRT-RIC and the nRT-RIC; performing data analytics; Artificial Intelligence/Machine Learning (AI/ML) training and inference for RAN optimization; and/or recommending configuration management actions over the O1 interface for managing the operation and maintenance (OAM), which is the interface that connects the SMO to RAN managed elements (e.g., nRT-RIC, O-RA centralized Unit (O-CU), O-RAN Distributed Unit (O-DU), etc.).

The nRT-RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The nRT-RIC uses the E2 interface to control the underlying RAN elements (E2 nodes/network functions (NFs)) over a near-real-time control loop. The nRT-RIC monitors, suspends/stops, overrides, and controls the E2 nodes (i.e., network functions such as O-CU-CP, O-CU-UP, O-DU, and O-eNB) via policies, wherein the O-DU connects to the O-RU over the FrontHaul including a Control User Synchronization (CUS) plane and the Management (M) plane. For example, the nRT sets policy parameters on activated functions of the E2 nodes. Further, the nRT-RIC hosts xApps to implement functions such as quality of service (QOS) optimization, mobility optimization, slicing optimization, interference mitigation, load balancing, security, etc. The two types of RICs work together to optimize the O-RAN. For example, the NRT-RIC provides, over the A1 interface, the policies, data, and AI/ML models enforced and used by the nRT-RIC for RAN optimization, and the nRT returns policy feedback (i.e., how the policy set by the NRT-RIC works).

The SMO framework, within which the NRT-RIC is located, manages and orchestrates RAN elements. Specifically, the SMO includes the Federated O-Cloud Orchestration and Management (FOCOM), a Network Function Orchestrator (NFO) that manages Virtual Machines (VM) based Virtual Network Functions (VNF) and/or could native network functions (CNF) and container (i.e., instance) based VNF and/or CNF, and the OAM as a part of the SMO that manages and orchestrates what is referred to as the O-Ran Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides infrastructure management services (IMS) and deployment management services (DMS), wherein the IMS provides functions that are responsible for the deployment and management of cloud infrastructures (i.e., the IMS orchestrates the O-Cloud infrastructure) and wherein the DMS provides functions responsible for the management of virtualized/containerized deployments on the O-Cloud infrastructure (i.e., the DMS orchestrates the virtualized/containerized deployments of the E2 nodes applications).

After an instantiation of E2 nodes (i.e., a virtualized/containerized deployment of the network functions such as VNF and/or CNF) to the O-Cloud infrastructure (i.e., a deployment to one or more O-Cloud nodes). The network function (i.e., a VNF and/or CNF) and/or the O-Cloud node (i.e., physical hosts such as servers or server clusters of the O-Cloud infrastructure) that are hosting the network function may suffer performance degradation over time.

In this case, one or more O-Cloud nodes running the network functions may require a reconfiguration. The reconfiguration of said one or more O-Cloud nodes needs to be communicated via a procedure that allows respective orchestration components of the O-RAN to know the status of the O-Cloud node reconfiguration and/or the status of the network function hosted by the one or more O-Cloud nodes that are undergoing reconfiguration in order to provide for a seamless operation of the O-RAN.

SUMMARY

According to embodiments, systems and methods are provided for implementing a reconfiguration of one or more open cloud (O-Cloud) nodes within an O-Cloud infrastructure of a telecommunications network, wherein the reconfiguration of one or more O-Cloud nodes is based on monitoring and analyzing the performance of at least one O-Cloud node or at least one function (e.g., VNF and/or CNF) hosted thereon. The systems and methods, upon receiving a request to reconfigure at least one O-Cloud node, provide for processing the reconfiguration request within the SMO and to request the IMS to control the implementation of the reconfiguration request, wherein the IMS controls the O-Cloud infrastructure to reconfigure the at least one O-Cloud node and reports the implementation of the reconfiguration to the SMO. The SMO determines whether the reconfiguration was successful or not, and, in case the SMO determines that a reconfiguration is unsuccessful, requests reinstatement of a configuration of at least one O-Cloud node to a state before a receiving a reconfiguration request to IMS (e.g., an original state). The monitoring and analyzing of the performance of at least one O-Cloud node as well as the reinstatement to the previous configuration state have the advantage that an O-cloud node can be reconfigured without a risk to worsen its performance.

As a result, in case an O-cloud node or the at least one network function hosted thereon cannot achieve a predetermined performance level (i.e., an unsuccessful reconfiguration), SMO identifies a fallback that does not allow the O-Cloud node to take on the inferior performance status but guides the O-Cloud to continue in the state before the reconfiguration.

According to an embodiment, a system for implementing a reconfiguration of one or more open cloud (O-Cloud) nodes within a O-Cloud infrastructure of a telecommunications network, includes at least one memory storing instructions; and at least one processor configured to execute the instructions to: obtain, by a federated O-Cloud orchestration and management (FOCOM) within the service management orchestration (SMO) framework, a request to reconfigure at least one O-Cloud node hosting at least one network function of the telecommunications network; send, by the FOCOM, a reconfiguration request for the at least one O-Cloud node to the O-Cloud infrastructure via an O2 interface to an infrastructure management services (IMS); receive, by the IMS, the reconfiguration request for the at least one O-Cloud node via the O2 interface, and control to implement the reconfiguration of the at least one O-Cloud node; and upon implementation of the reconfiguration, send, by the IMS, a confirmation of the reconfiguration implementation to the FOCOM within SMO via the O2 interface.

The at least one processor may be further configured to execute the instructions to: monitor, by a non-real time radio intelligent controller (NRT-RIC), at least one of O-Cloud data received over the O2 interface and network function data received over an O1 interface; analyze the at least one of the O-Cloud data and the network function data and, based on the analysis, determine the at least one O-Cloud node to be reconfigured within the O-Cloud infrastructure; send a reconfiguration request for the at least one O-Cloud node to the FOCOM.

The at least one processor may be further configured to execute the instructions to: determine, by the FOCOM, which specific O-Cloud nodes, among a plurality of O-Cloud nodes, requires reconfiguration and in which sequence the reconfiguration of the specific O-Cloud nodes is performed.

The at least one processor may be further configured to execute the instructions to: send, by the IMS, a status of the reconfiguration to the NRT-RIC via the O2 interface.

The at least one processor may be further configured to execute the instructions to: based on determining, by the SMO, that the reconfiguration has not been successful with respect to an O-Cloud node from among the at least one O-Cloud node, configure the O-Cloud node back to a configuration prior to the reconfiguration request.

The at least one processor may be further configured to execute the instructions to verify, by the SMO, the reconfiguration of the at least one O-Cloud node.

The at least one processor may be further configured to execute the instructions to: determine, by the IMS, to relocate the at least one network function from the at least one O-Cloud node to be reconfigured to one or more other O-Cloud nodes; and relocate, by the IMS, the at least one network function to the one or more other O-Cloud nodes.

The at least one processor may be further configured to execute the instructions to: upon implementation of the reconfiguration, relocate, by the IMS, the at least one network function back to the one or more reconfigured O-Cloud nodes in the O-Cloud infrastructure.

According to an embodiment, a method for implementing reconfiguration procedure of one or more open cloud (O-Cloud) nodes within a O-Cloud infrastructure of a telecommunications network, includes: obtaining, by a federated O-Cloud orchestration and management (FOCOM) within the service management orchestration (SMO) framework, a request to reconfigure at least one O-Cloud node hosting at least one network function of the telecommunications network; sending, by the FOCOM, a reconfiguration request for the at least one O-Cloud node to the O-Cloud infrastructure via an O2 interface to an infrastructure management services (IMS); receiving, by the IMS, the reconfiguration request for the at least one O-Cloud node via the O2 interface, and controlling to implement the reconfiguration of the at least one O-Cloud node; and upon implementation of the reconfiguration, sending, by the IMS, a confirmation of the reconfiguration implementation to the FOCOM within SMO via the O2 interface.

The method may include monitoring, by a non-real time radio intelligent controller (NRT-RIC), at least one of O-Cloud data received over the O2 interface and network function data received over an O1 interface; analyzing the at least one of the O-Cloud data and the network function data and, based on the analysis, determine the at least one O-Cloud node to be reconfigured within the O-Cloud infrastructure; sending a reconfiguration request for the at least one O-Cloud node to the FOCOM.

The method may include determining, by the FOCOM, which specific O-Cloud nodes, among a plurality of O-Cloud nodes, requires reconfiguration and in which sequence the reconfiguration of the specific O-Cloud nodes is performed.

The method may include sending, by the IMS, a status of the reconfiguration to the NRT-RIC via the O2 interface.

The method may include based on determining, by the SMO, that the reconfiguration has not been successful with respect to an O-Cloud node from among the at least one O-Cloud node, configuring the O-Cloud node back to a configuration prior to the reconfiguration request.

The method may include verifying, by the SMO, the reconfiguration of the at least one O-Cloud node.

The method may include determining, by the IMS, to relocate the at least one network function from the at least one O-Cloud node to be reconfigured to one or more other O-Cloud nodes; and relocating, by the IMS, the at least one network function to the one or more other O-Cloud nodes.

The method may include upon implementation of the reconfiguration, relocating, by the IMS, the at least one network function back to the one or more reconfigured O-Cloud nodes in the O-Cloud infrastructure.

According to an embodiment, a non-transitory computer-readable recording medium has recorded thereon instructions executable by at least one processor configured to perform a method for implementing reconfiguration procedure of one or more open cloud (O-Cloud) nodes within a O-Cloud infrastructure of a telecommunications network, the method including: obtaining, by a federated O-Cloud orchestration and management (FOCOM) within the service management orchestration (SMO) framework, a request to reconfigure at least one O-Cloud node hosting at least one network function of the telecommunications network; sending, by the FOCOM, a reconfiguration request for the at least one O-Cloud node to the O-Cloud infrastructure via an O2 interface to an infrastructure management services (IMS); receiving, by the IMS, the reconfiguration request for the at least one O-Cloud node via the O2 interface, and controlling to implement the reconfiguration of the at least one O-Cloud node; and upon implementation of the reconfiguration, sending, by the IMS, a confirmation of the reconfiguration implementation to the FOCOM within SMO via the O2 interface.

The method may include monitoring, by a non-real time radio intelligent controller (NRT-RIC), at least one of O-Cloud data received over the O2 interface and network function data received over an O1 interface; analyzing the at least one of the O-Cloud data and the network function data and, based on the analysis, determine the at least one O-Cloud node to be reconfigured within the O-Cloud infrastructure; sending a reconfiguration request for the at least one O-Cloud node to the FOCOM.

The method may include determining, by the IMS, to relocate the at least one network function from the at least one O-Cloud node to be reconfigured to one or more other O-Cloud nodes; and relocating, by the IMS, the at least one network function to the one or more other O-Cloud nodes.

The method may include upon implementation of the reconfiguration, relocating, by the IMS, the at least one network function back to the one or more reconfigured O-Cloud nodes in the O-Cloud infrastructure.

Additional aspects will be set forth in part in the description that follows and, in part, will be apparent from the description, or may be realized by practice of the presented embodiments of the disclosure

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and

[B]" or "at least one of [A] or [B]" are to be understood as including only A, only B, or both A and B.

Figure 1:
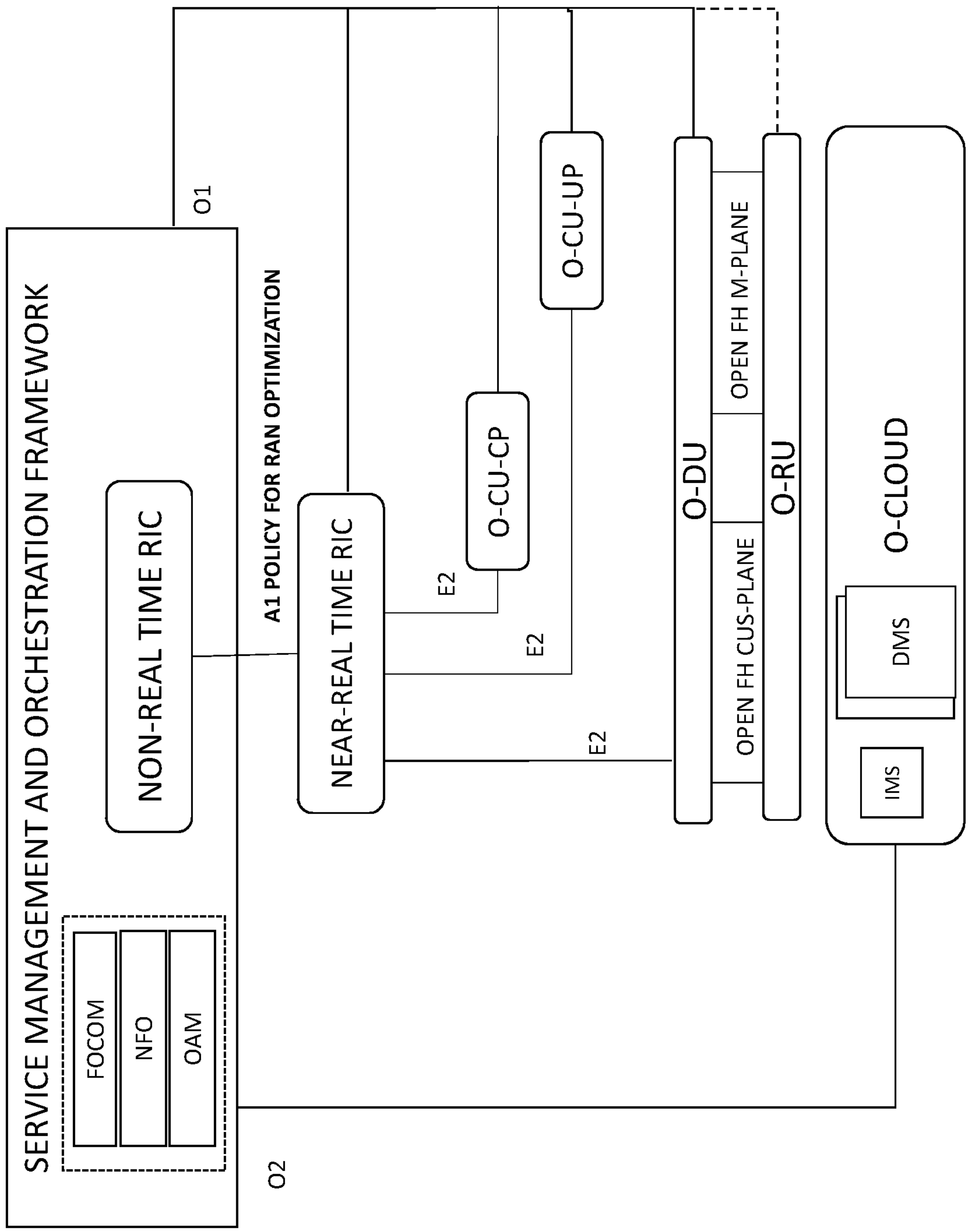
FIG. 1 illustrates an O-RAN architecture according to the related art.
Figure 2:
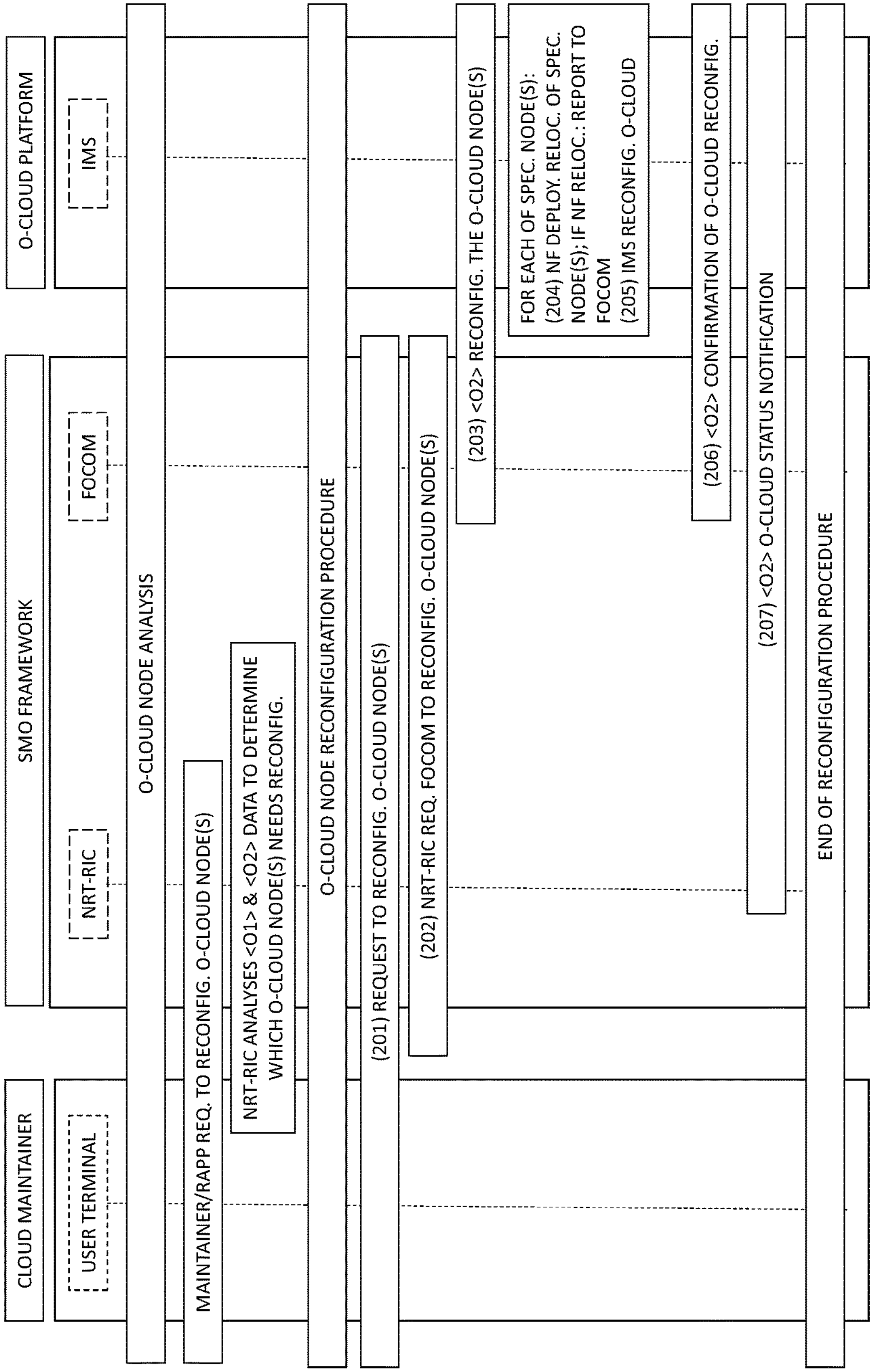
FIG. 2 illustrates a diagram of a flowchart of the method for implementing a reconfiguration of one or more O-Cloud nodes according to an embodiment.

FIG. 2 illustrates a diagram of a flowchart of the method for implementing a reconfiguration of one or more O-Cloud nodes according to an embodiment. The key components of the O-RAN architecture in FIG. 2 are similar to those according to FIG. 1.

Referring to FIG. 2, the method for implementing a reconfiguration of one or more O-Cloud nodes may be triggered by an event such as performance degradation of an application (e.g., a network function such as a VNF and/or CNF) deployed on one or more O-Cloud nodes (e.g., E2 node performance data), or input from non-RAN sources (e.g., O1 interface and/or O2 interface data).

The event may be upcoming natural events (e.g., seasonal requirements, hardware failure, user movement, natural disasters, etc.) or scheduled human events (e.g., network maintenance, sporting events, etc.) that have an impact on the performance of the at least one O-Cloud node or the at least one network function hosted thereon.

The application performance of, for example, at least one network function may get degraded due to a misconfiguration of at least one O-Cloud node or due to the requirements of the application that may require more computational and/or hardware resources or changes to the O-Cloud node configuration to perform optimally.

In FIG. 2, the method for implementing the reconfiguration of one or more O-Cloud nodes may be initiated by either a manual request to the SMO by a user or by one or more rApps of the NRT-RIC within the SMO.

Referring to FIG. 2, the initiation is illustrated as an O-Cloud node analysis process and marks the beginning of the O-Cloud node reconfiguration procedure. The initiation according to the O-Cloud node analysis process is based on monitoring, by the NRT-RIC, at least one of O-Cloud data received over the O2 interface and network function data received over an O1 interface, analyze the at least one of the O-Cloud data and the network function data and, based on the analysis, determine the at least one O-Cloud node to be reconfigured within the O-Cloud infrastructure.

To this end, in case the NRT-RIC within the SMO initiates the method, one or more rApps in NRT-RIC perform the O-Cloud node analysis process as set forth above.

In an example embodiment, the analysis may be based on a comparison between O2 interface telemetric data relating to the performance of at least one O-Cloud node (e.g., O-Cloud data such as processor load, memory usage, etc.) and/or O1 interface telemetric data relating the performance of at least one network function (e.g., VNF(s) and/or CNF(s) implementing O-CU, O-DU, etc.) hosted thereon (e.g., RAN-data such as a number of users, data throughput, etc.). Based on the analysis, the NRT-RIC (e.g., one or more rApps of the NRT-RIC) determines to reconfigure at least one O-Cloud node among a plurality of O-Cloud nodes (i.e., the NRT-RIC initiates the O-Cloud reconfiguration procedure for at least one O-Cloud node).

According to the O-Cloud reconfiguration procedure, in operation 201, in one example embodiment, the SMO (i.e., the FOCOM) obtains a request to reconfigure at least one O-Cloud node from a manual input based on the result of a manual O-Cloud analysis as set forth above.

In operation 202, in another example embodiment, the FOCOM obtains a request to reconfigure at least one O-Cloud node from the NRT-RIC based on the result of an O-Cloud analysis process as set forth above.

In operation 203, the FOCOM determines which specific O-Cloud nodes requires reconfiguration and determines in which sequence (i.e., order) the reconfiguration of the specific O-Cloud nodes, among the plurality of O-Cloud nodes is performed.

In an example embodiment, based on the performance of the one more O-Cloud nodes or the network functions hosted thereon, the SMO (i.e., the NRT-RIC and/or FOCOM) may determine at least one specific O-Cloud node as well as the reconfiguration sequence of the specific O-Cloud nodes for itself.

In another example embodiment, a user (e.g., a cloud maintainer) may provide a maintenance plan (i.e., a specification of each O-Cloud and the reconfiguration schedule thereof) to the FOCOM. In this case, the reconfiguration is specified by a user and provided to the FOCOM, the SMO/FOCOM does not commence a determination for itself.

Still referring to operation 203, the FOCOM, upon the determination or specification as set forth above, sends a reconfiguration request to the IMS via the O2 interface. The reconfiguration request comprises, for each of the O-Cloud nodes to be reconfigured, the configuration data and the respective reconfiguration schedule.

In operations 204 and 205, upon receiving the FOCOM reconfiguration request via the O2 interface, the IMS controls to implement the reconfiguration for each O-Cloud node to be reconfigured.

To this end, the IMS evaluates the FOCOM reconfiguration request and, in accordance with the scope of the configuration data and the respective reconfiguration schedule for each O-Cloud node, determines whether to relocate affected applications of network functions (i.e., VNF and/or CNF) hosted by the O-Cloud to be reconfigured to other O-Cloud resources (e.g., to drain an O-Cloud node to be reconfigured) due to the scope of the reconfiguration requirement for said O-Cloud node.

In operation 204, the IMS determines to relocate applications of at least one network function (i.e., VNF and/or CNF) hosted on an O-Cloud node (e.g., to drain a O-Cloud node). For example, at least one physical host of an O-Cloud node may require rebooting for the implementation of the reconfiguration). In this case, the applications of at least one network function (i.e., VNF and/or CNF) hosted on the O-Cloud node may be terminated. To this end, during a grace period that lowers the impact of the termination on the operation of the RAN, the applications of the affected at least one network function are instantiated on one or more other O-Cloud nodes (i.e., instantiated on physical hosts other than that to be reconfigured). The other O-Cloud node (e.g., an auxiliary O-Cloud node) may comprise one or more physical hosts such as servers or server clusters. Moreover, the other O-Cloud node (e.g., auxiliary O-Cloud node) may be a part of an affected O-Cloud node and comprise one or more physical hosts other than that to be reconfigured.

Upon the instantiation of the affected applications of at least one network function on the one or more other O-Cloud nodes (e.g., auxiliary O-Cloud nodes), the IMS sends a network function relocation report to the FOCOM to inform the SMO of the whereabouts of the affected applications of at least one network function (i.e., VNF and/or CNF) that were originally hosted on the O-Cloud node to be rebooted for reconfiguration.

The IMS, upon sending the network function relocation report, controls the implementation of the affected O-Cloud node and marks the O-Cloud node to be scheduled again after the reconfiguration has been applied (i.e., recommissioned for service after reconfiguration). In an example embodiment, the IMS may relocate the affected at least one network function back to the reconfigured O-Cloud note before it marks the O-Cloud node to be scheduled again.

In operation 205, the IMS determines not to relocate applications of at least one network function (i.e., VNF and/or CNF) hosted on an O-Cloud node (e.g., not to drain an O-Cloud node, but to reconfigure the O-Cloud node on the fly). In this case, the IMS may schedule are grace period for the reconfiguration, control the implementation of the O-Cloud node and mark the O-Cloud node to be scheduled again after the reconfiguration has been applied.

In operation 206, the IMS, for each respective O-Cloud node notifies SMO that the O-Cloud node configuration is completed. In an example embodiment, the IMS sends a reconfiguration confirmation to the FOCOM via the O2 interface.

In operation 207, in an example embodiment, in case the NRT-RIC has subscribed for IMS notifications, the IMS notifies to NRT-RIC about the status of the O-Cloud node (i.e., the status of the reconfigured O-Cloud node (s)) via the O2 interface. In another example embodiment, the IMS may notify the FOCOM and the NRT-RIC about the completion of the reconfiguration via the O2 interface.

Referring to FIG. 2, the method for implementing the reconfiguration of one or more O-Cloud nodes ends when the SMO verified the performance of each O-Cloud node or the performance of network function (i.e., VNF and/or CNF) hosted thereon after reconfiguration (i.e., the SMO monitors and analyses performance related O-Cloud data received over the O2 interface and network function data received over an O1 interface data after reconfiguration to confirm the successful implementation of the reconfiguration for each O-Cloud node).

Figure 3:
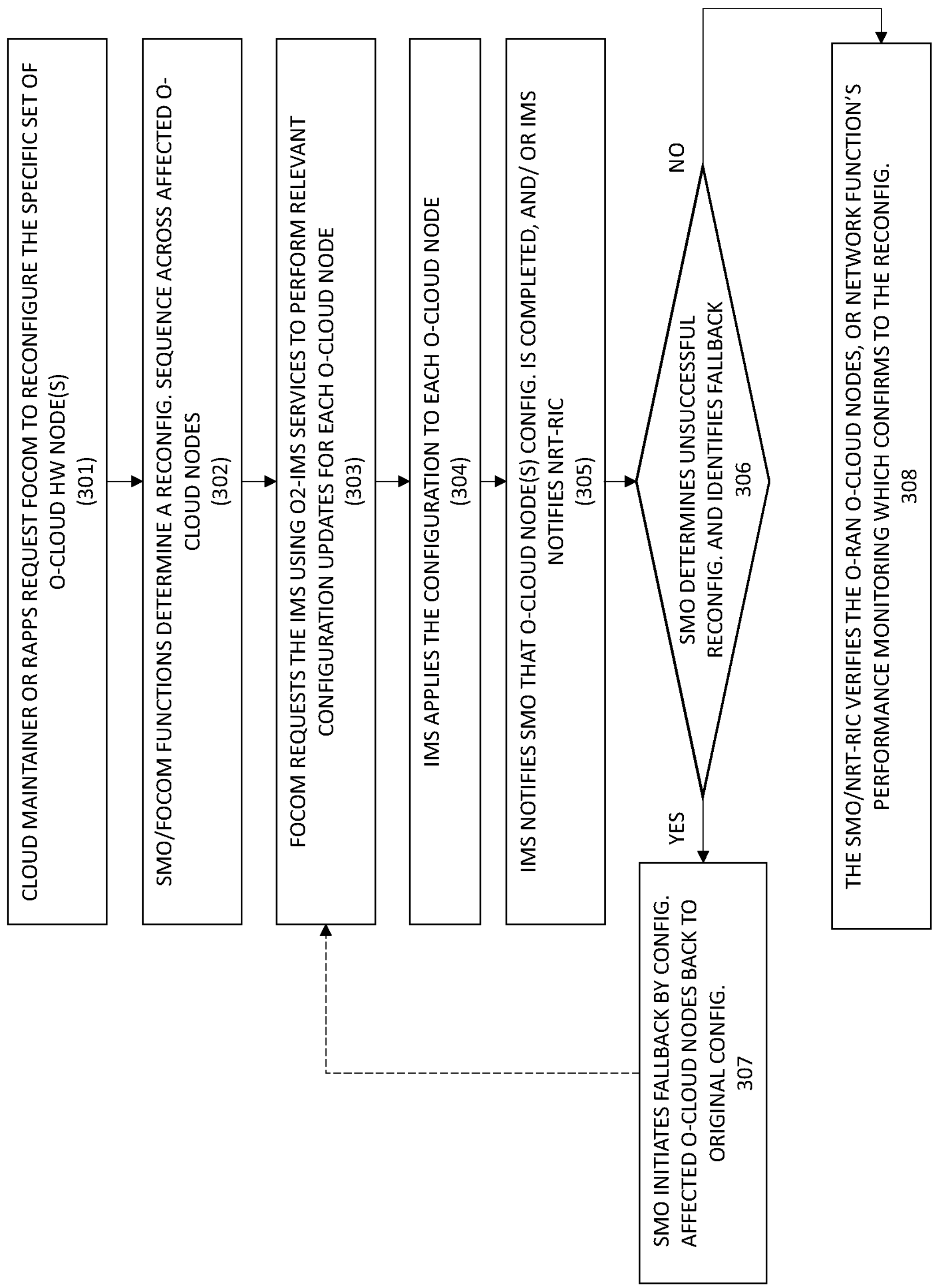
FIG. 3 illustrates a diagram of a flowchart of the method for implementing a reconfiguration of one or more O-Cloud nodes according to another embodiment.

FIG. 3 illustrates a diagram of a flowchart of the method for implementing a reconfiguration of one or more O-Cloud nodes according to another embodiment.

Referring to FIG. 3, in step 301, a user (e.g., the cloud maintainer) or the NRT-RIC sends a request to reconfigure one or more O-Cloud nodes (e.g., physical hosts such as servers or server clusters) to the FOCOM.

In step 302, the SMO/FOCOM functions determine or specify the O-Cloud nodes to be reconfigured and, among a plurality of O-Cloud nodes, determine the sequence for commencing the reconfiguration as set forth above in operation 203 of FIG. 2.

In step 303, upon the determination and specification, the FOCOM sends a reconfiguration request to the IMS via the O2 interface. To this end, the FOCOM requests the IMS using O2 IMS service functions to perform relevant configuration updates for each O-Cloud node that is required to be reconfigured and provides the respective reconfiguration sequences thereto. In an example embodiment, the request to the IMS via the O2 interface can be repeated each time when one or more O-Cloud nodes are required to be reconfigured.

In an example embodiment, the request to the IMS via the O2 interface may be repeated for each O-Cloud node, in case the SMO determines that a reconfiguration of an O-Cloud node was unsuccessful.

In step 304, similarly to operations 204 and 205 of FIG. 2, the IMS controls to implement the reconfiguration of each O-cloud node (i.e., the IMS applies the configuration to each O-Cloud node in accordance with the reconfiguration request of the FOCOM).

In step 305, the IMS notifies the SMO (e.g., the FOCOM) that the O-Cloud node(s) configuration (reconfiguration) is completed. In accordance with operations 206 and 207 of FIG. 2, the IMS may notify the status of the reconfiguration to the FOCOM and/or the NRT-RIC, based on whether the NRT-RIC has subscribed for IMS notifications.

In step 306, the SMO determines, for each O-Cloud node, whether a reconfiguration of the O-Cloud node was successful or not. The determination may be based on the status of the reconfiguration to the FOCOM and/or the NRT-RIC. In an example embodiment, the determination may be based on O2 interface telemetric data relating to the performance of at least one O-Cloud node (e.g., O-Cloud data such as processor load, memory usage, etc.) and/or O1 interface telemetric data relating the performance of at least one network function (i.e., VNF(s) and/or CNF(s)) hosted thereon (e.g., RAN-data such as a number of users, data throughput, etc.).

In step 307, the SMO determines that the reconfiguration was unsuccessful (YES in step 306). Based on the determination of an unsuccessful reconfiguration, the SMO identifies a fallback for the unsuccessfully reconfigured O-Cloud node. For example, the SMO sends a request to the IMS to configure the O-Cloud node back to a configuration prior to the reconfiguration request. In another example embodiment, the SMO may request a repetition of the reconfiguration of the O-Cloud node to the IMS (to a state prior the reconfiguration request to the IMS in step 303 (e.g., a repetition loop in step 303)). In another example embodiment, the SMO may send a request to reinstate the configuration of the O-Cloud node to its original state.

In step 309, the SMO determines that the reconfiguration was successful (NO in step 306). Based on the determination of an successful reconfiguration, the SMO/NRT-RIC verifies successful reconfiguration. To this end, the SMO/NRT-RIC verifies that the performance of each O-Cloud node or the performance of network function (i.e., VNF and/or CNF) hosted thereon after reconfiguration (i.e., the SMO/NRT-RIC monitors and analyses performance related O-Cloud data received over the O2 interface and network function data received over an O1 interface data after reconfiguration to confirm the successful implementation of the reconfiguration for each O-Cloud node). The verification of the SMO confirms the reconfiguration and ends the O-Cloud node reconfiguration procedure.

Figure 4:
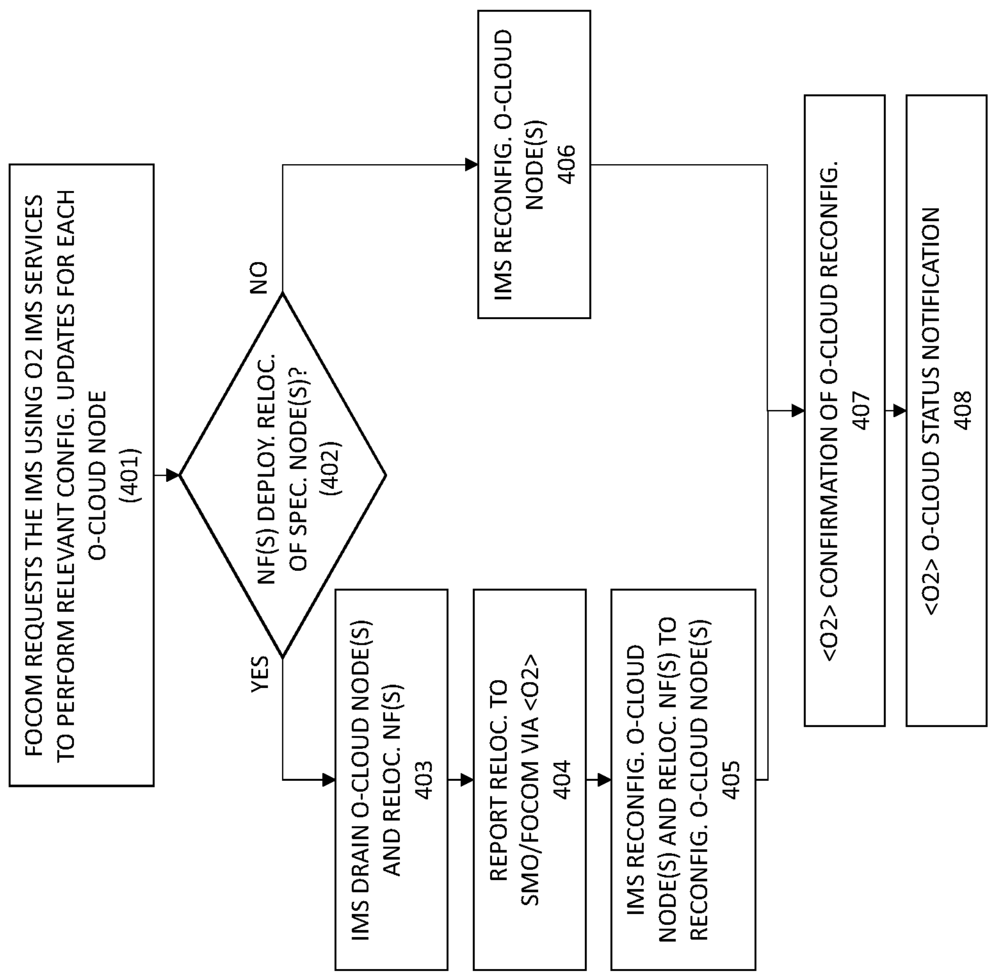
FIG. 4 illustrates a diagram of a flowchart of the method for implementing a reconfiguration of one or more O-Cloud nodes according to another embodiment.

FIG. 4 illustrates a diagram of a flowchart of the method for implementing a reconfiguration of one or more O-Cloud nodes according to another embodiment.

Referring to FIG. 4, in step 401, similar to step 303 of FIG. 3, the FOCOM sends a reconfiguration request to the IMS via the O2 interface.

In step 402, similar to step 303 of FIG. 3 (i.e., operations 204 and 205 of FIG. 2), the IMS evaluates the FOCOM reconfiguration request and, in accordance with the scope of the configuration data of each O-Cloud node and respective reconfiguration schedule for each O-Cloud node.

In step 403, the IMS determines to relocate at least one network function hosted by a O-Cloud to be reconfigured (YES in step 402). For example, the IMS determines to drain an O-Cloud node to be reconfigured due to the scope of the reconfiguration requirement for said O-Cloud node (e.g., at least one physical node of the O-Cloud node may require re-booting for the implementation reconfiguration).

In this case, the affected applications of at least one network function (i.e., VNF and/or CNF) hosted on the O-Cloud node may be terminated. To this end, during a grace period that lowers the impact of the termination on the operation of the RAN, the affected applications of at least one of the network functions are instantiated on one or more other O-Cloud nodes (i.e., auxiliary O-Cloud nodes comprising physical hosts other than that to be reconfigured). The other O-Cloud nodes (e.g., auxiliary O-Cloud nodes)

may comprise one or more physical hosts such as servers or server clusters. Moreover, the other O-Cloud node (e.g., auxiliary O-Cloud node) may be a part of an affected O-Cloud node to be reconfigured and comprise one or more physical hosts other than that to be reconfigured.

In step 404, upon the instantiation of the affected applications of at least one network function on the one more auxiliary O-Cloud nodes, the IMS sends a network function relocation report to the FOCOM to inform the SMO of the whereabouts of the applications of at least one network function hosted on the O-Cloud node to be rebooted for reconfiguration.

In step 405, the IMS, upon sending the network function relocation report, controls the implementation of the O-Cloud node reconfiguration and marks the O-Cloud node to be scheduled again after the reconfiguration has been applied. To this end, the IMS reconfigures the O-Cloud node and relocates the affected applications of at least one network function (i.e., VNF and/or CNF) back to the reconfigured O-Cloud node. In an example embodiment, the IMS may relocate the affected applications at least one network function to the original O-Cloud note before it marks the O-Cloud node to be scheduled again after the reconfiguration has been applied.

In operation 406, determines not to relocate applications of at least one network function (i.e., VNF and/or CNF) hosted on an O-Cloud node (e.g., not to drain an O-Cloud node, but to reconfigure the O-Cloud node on the fly) (NO in step 402). In this case, the IMS may schedule are grace period for the reconfiguration, control the implementation of the O-Cloud node and mark the O-Cloud node to be scheduled again after the reconfiguration has been applied.

In operation 407, similar to operation 206 of FIG. 2, the IMS, for each respective O-Cloud node notifies the SMO that the O-Cloud node configuration is completed. In an example embodiment, the IMS sends a reconfiguration confirmation to the FOCOM via the O2 interface.

In operation 408, similar to operation 207 of FIG. 2, in case the NRT-RIC has subscribed for IMS notifications, the IMS notifies the NRT-RIC about the status of the O-Cloud (i.e., the status of the reconfigured O-Cloud node(s)) via the O2 interface. In another example embodiment, the IMS may notify the FOCOM and the NRT-RIC about the completion of the reconfiguration via the O2 interface.

Figure 5:
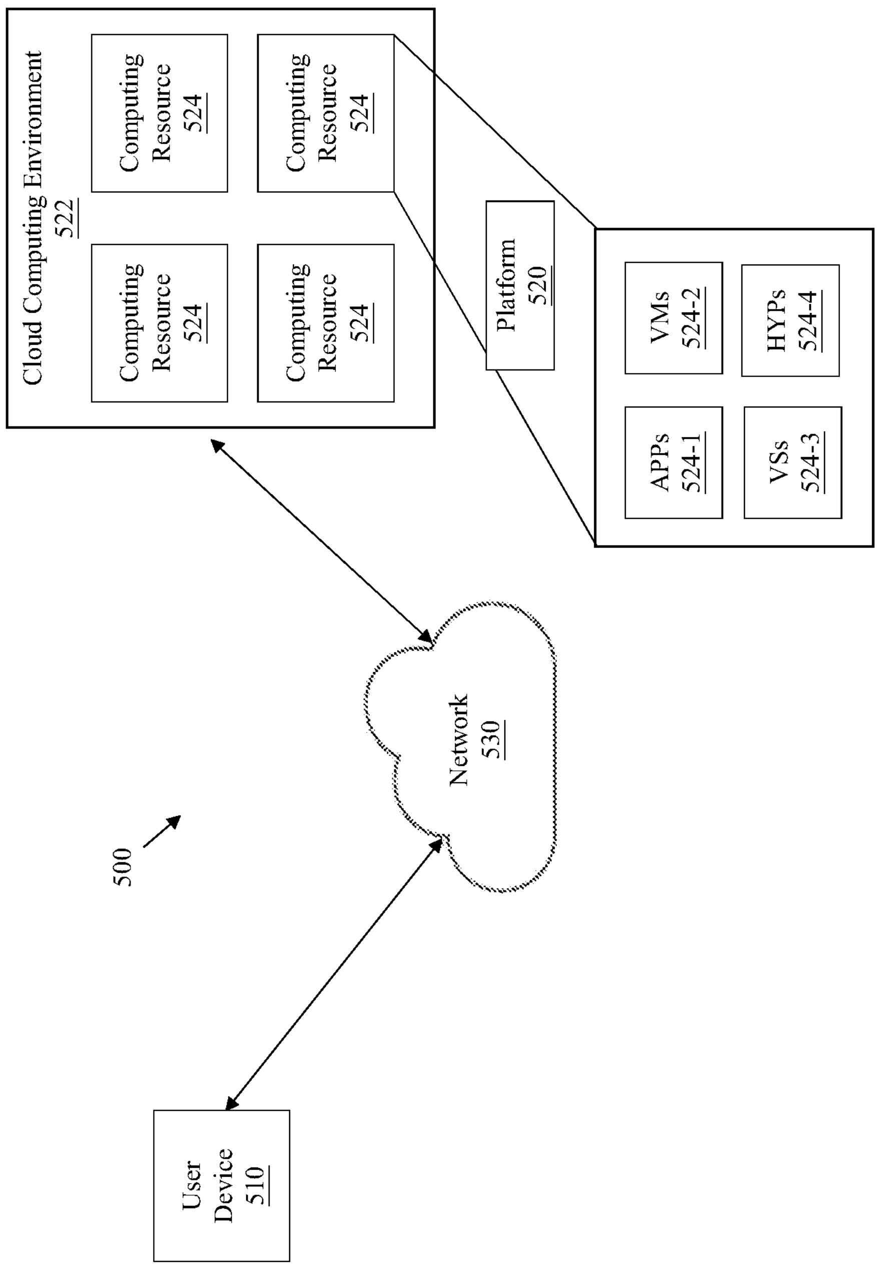
FIG. 5 is a diagram of an example environment in which systems and/or methods, described herein, may be implemented.

FIG. 5 is a diagram of an example environment 500 in which systems and/or methods, described herein, may be implemented. As shown in FIG. 5, environment 500 may include a user device 510, a platform 520, and a network 530. Devices of environment 500 may interconnect via wired connections, wireless connections, or a combination of wired and wireless connections. In embodiments, any of the functions and operations described with reference to FIG. 1 above may be performed by any combination of elements illustrated in FIG. 5.

User device 510 includes one or more devices capable of receiving, generating, storing, processing, and/or providing information associated with platform 520. For example, user device 510 may include a computing device (e.g., a desktop computer, a laptop computer, a tablet computer, a handheld computer, a smart speaker, a server, etc.), a mobile phone (e.g., a smartphone, a radiotelephone, etc.), a wearable device (e.g., a pair of smart glasses or a smart watch), or a similar device. In some implementations, user device 510 may receive information from and/or transmit information to platform 520.

Platform 520 includes one or more devices capable of receiving, generating, storing, processing, and/or providing information. In some implementations, platform 520 may include a cloud server or a group of cloud servers. In some implementations, platform 520 may be designed to be modular such that certain software components may be swapped in or out depending on a particular need. As such, platform 520 may be easily and/or quickly reconfigured for different uses.

In some implementations, as shown, platform 520 may be hosted in cloud computing environment 522. Notably, while implementations described herein describe platform 520 as being hosted in cloud computing environment 522, in some implementations, platform 520 may not be cloud-based (i.e., may be implemented outside of a cloud computing environment) or may be partially cloud-based.

Cloud computing environment 522 includes an environment that hosts platform 520. Cloud computing environment 522 may provide computation, software, data access, storage, etc., services that do not require end-user (e.g., user device 510) knowledge of a physical location and configuration of system(s) and/or device(s) that hosts platform 520. As shown, cloud computing environment 522 may include a group of computing resources 524 (referred to collectively as "computing resources 524" and individually as "computing resource 524").

Computing resource 524 includes one or more personal computers, a cluster of computing devices, workstation computers, server devices, or other types of computation and/or communication devices. In some implementations, computing resource 524 may host platform 520. The cloud resources may include compute instances executing in computing resource 524, storage devices provided in computing resource 524, data transfer devices provided by computing resource 524, etc. In some implementations, computing resource 524 may communicate with other computing resources 524 via wired connections, wireless connections, or a combination of wired and wireless connections.

As further shown in FIG. 5, computing resource 524 includes a group of cloud resources, such as one or more applications ("APPs") 524-1, one or more virtual machines ("VMs") 524-2, virtualized storage ("VSs") 524-3, one or more hypervisors ("HYPs") 524-4, or the like.

Application 524-1 includes one or more software applications that may be provided to or accessed by user device 510. Application 524-1 may eliminate a need to install and execute the software applications on user device 510. For example, application 524-1 may include software associated with platform 520 and/or any other software capable of being provided via cloud computing environment 522. In some implementations, one application 524-1 may send/receive information to/from one or more other applications 524-1, via virtual machine 524-2.

Virtual machine 524-2 includes a software implementation of a machine (e.g., a computer) that executes programs like a physical machine. Virtual machine 524-2 may be either a system virtual machine or a process virtual machine, depending upon use and degree of correspondence to any real machine by virtual machine 524-2. A system virtual machine may provide a complete system platform that supports execution of a complete operating system ("OS"). A process virtual machine may execute a single program, and may support a single process. In some implementations, virtual machine 524-2 may execute on behalf of a user (e.g., user device 510), and may manage infrastructure of cloud computing environment 522, such as data management, synchronization, or long-duration data transfers.

Virtualized storage 524-3 includes one or more storage systems and/or one or more devices that use virtualization techniques within the storage systems or devices of computing resource 524. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 524-4 may provide hardware virtualization techniques that allow multiple operating systems (e.g., "guest operating systems") to execute concurrently on a host computer, such as computing resource 524. Hypervisor 524-4 may present a virtual operating platform to the guest operating systems, and may manage the execution of the guest operating systems. Multiple instances of a variety of operating systems may share virtualized hardware resources.

Network 530 includes one or more wired and/or wireless networks. For example, network 530 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
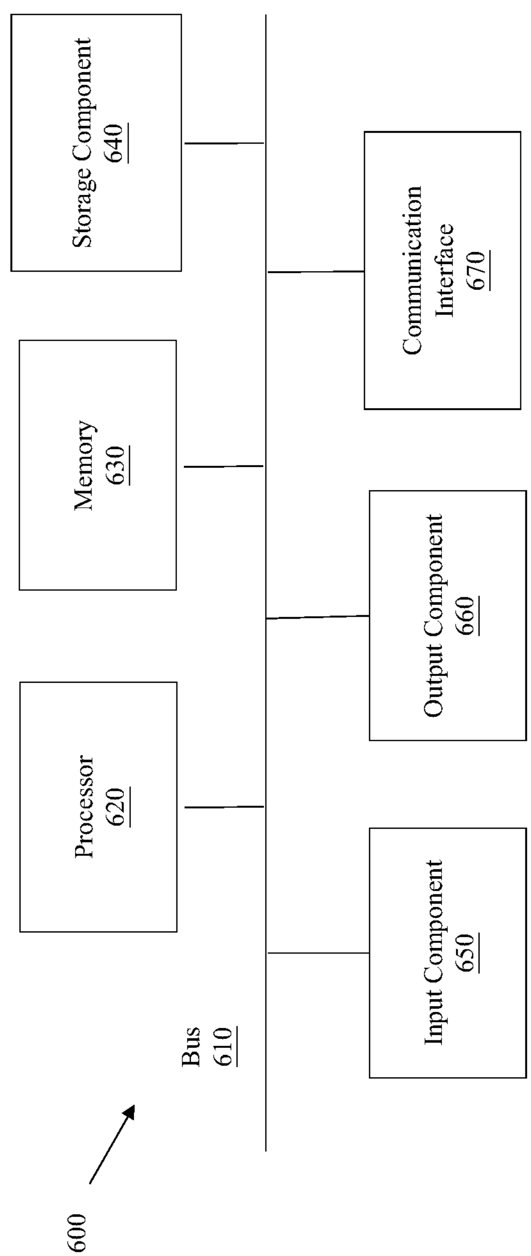
FIG. 6 is a diagram of example components of a device according to an embodiment.

FIG. 6 is a diagram of example components of a device 600. Device 600 may correspond to user device 510 and/or platform 520. As shown in FIG. 6, device 600 may include a bus 610, a processor 620, a memory 630, a storage component 640, an input component 650, an output component 660, and a communication interface 670.

Bus 610 includes a component that permits communication among the components of device 600. Processor 620 may be implemented in hardware, firmware, or a combination of hardware and software. Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 650 includes a component that permits device 600 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from device 600 (e.g., a display, a speaker, and/or one or more light-emitting diodes (LEDs)).

Communication interface 670 includes a transceiver-like component (e.g., a transceiver and/or a separate receiver and transmitter) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, or the like.

Device 600 may perform one or more processes described herein. Device 600 may perform these processes in response to processor 620 executing software instructions stored by a non-transitory computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

In embodiments, any one of the operations or processes of FIGS. 1, 2, 3 and 4 may be implemented using any of the elements illustrated in FIGS. 5 and 6.

According to embodiments, systems and methods are provided for implementing a reconfiguration of one or more open cloud (O-Cloud) nodes within an O-Cloud infrastructure of a telecommunications network, wherein the reconfiguration of one or more O-Cloud nodes is based on monitoring and analyzing the performance of at least one O-Cloud node or at least one network function hosted thereon. In particular, the system and methods provide for a determination of whether the reconfiguration was successful or not, and, in case of a determination that a reconfiguration is unsuccessful, request reinstatement of a configuration of at least one O-Cloud node to a state before a receiving a reconfiguration request to IMS (e.g., an original state). The monitoring and analyzing of the performance of at least one O-Cloud node as well as the reinstatement to the previous configuration state have the advantage that an O-cloud node can be reconfigured without a risk to worsen its performance. As a result, in case an O-cloud node or the at least one network function hosted thereon cannot achieve a predetermined performance level (i.e., an unsuccessful reconfiguration), SMO identifies a fallback that does not allow the O-Cloud node to take on the inferior performance status but guides the O-Cloud to continue in the state before the reconfiguration The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system for implementing a reconfiguration of one or more open cloud (O-Cloud) nodes within a O-Cloud infrastructure of an open radio access network (O-RAN), the system comprising:

at least one memory storing instructions; and at least one processor configured to execute the instructions to implement a federated O-Cloud orchestration and management (FOCOM) within a service management orchestration (SMO) framework, the FOCOM configured to:

obtain a request to reconfigure at least one O-Cloud node hosting at least one network function of the O-RAN;

send a reconfiguration request for the at least one O-Cloud node to the O-Cloud infrastructure via an O2 interface to an infrastructure management services (IMS); and upon implementation of the reconfiguration, receive a confirmation of the reconfiguration implementation from the IMS via the 02 interface, wherein the FOCOM determines in which sequence the reconfiguration of the at least one O-Cloud nodes is performed, based on performance data of the at least one O-Cloud node, and wherein based on determining that the reconfiguration has not been successful, the FOCOM controls to configure the at least one O-Cloud node back to a configuration prior to the reconfiguration request.

2. The system as claimed in claim 1, wherein the system further comprises a non-real time radio intelligent controller (NRT-RIC) configured to:

monitor at least one of O-Cloud data received over the O2 interface and network function data received over an O1 interface;

analyze the at least one of the O-Cloud data and the network function data and, based on the analysis, determine the at least one O-Cloud node to be reconfigured within the O-Cloud infrastructure;

send the reconfiguration request for the at least one O-Cloud node to the FOCOM based on the analyzing.

3. The system as claimed in claim 2, wherein the NRT-RIC is further configured to:

receive, from the IMS, a status of the reconfiguration via the O2 interface.

4. The system as claimed in claim 1, wherein the FOCOM is further configured to:

determine which specific O-Cloud nodes, among a plurality of O-Cloud nodes, requires reconfiguration.

5. The system as claimed in claim 1, wherein the FOCOM is further configured to verify the reconfiguration of the at least one O-Cloud node.

6. The system as claimed in claim 1, further comprising the IMS configured to:

determine to relocate the at least one network function from the at least one O-Cloud node to be reconfigured to one or more other O-Cloud nodes; and relocate the at least one network function to the one or more other O-Cloud nodes.

7. The system as claimed in claim 6, wherein the IMS is further configured to:

upon implementation of the reconfiguration on the at least one O-Cloud node, relocate the at least one network function from the one or more other O-Cloud nodes back to the at least one reconfigured O-Cloud node.

8. A method for implementing reconfiguration procedure of one or more open cloud (O-Cloud) nodes within a O-Cloud infrastructure of an open radio access network (O-RAN), the method comprising:

obtaining, by a federated O-Cloud orchestration and management (FOCOM) within a service management orchestration (SMO) framework, a request to reconfigure at least one O-Cloud node hosting at least one network function of the O-RAN;

sending, by the FOCOM, a reconfiguration request for the at least one O-Cloud node to the O-Cloud infrastructure via an O2 interface to an infrastructure management services (IMS);and upon implementation of the reconfiguration, receiving, by the FOCOM, a confirmation of the reconfiguration implementation from the IMS via the O2 interface, wherein the method further comprises:

determining, by the FOCOM, in which sequence the reconfiguration of the at least one O-Cloud nodes is performed, based on performance data of the at least one O-Cloud node, and wherein based on determining that the reconfiguration has not been successful, the FOCOM controls to configure the at least one O-Cloud node back to a configuration prior to the reconfiguration request.

9. The method as claimed in claim 8, wherein the method comprises:

monitoring, by a non-real time radio intelligent controller (NRT-RIC), at least one of O-Cloud data received over the O2 interface and network function data received over an O1 interface;

analyzing, by the NRT-RIC, the at least one of the O-Cloud data and the network function data and, based on the analysis, determine the at least one O-Cloud node to be reconfigured within the O-Cloud infrastructure;

sending, by the NRT-RIC, the reconfiguration request for the at least one O-Cloud node to the FOCOM based on the analyzing.

10. The method as claimed in claim 9, wherein the method comprises:

sending, by the IMS, a status of the reconfiguration to the NRT-RIC via the O2 interface.

11. The method as claimed in claim 8, wherein the method comprises:

determining, by the FOCOM, which specific O-Cloud nodes, among a plurality of O-Cloud nodes, requires reconfiguration.

12. The method as claimed in claim 8, wherein the method comprises:

verifying, by the SMO, the reconfiguration of the at least one O-Cloud node.

13. The method as claimed in claim 8, wherein the method comprises:

determining, by the IMS, to relocate the at least one network function from the at least one O-Cloud node to be reconfigured to one or more other O-Cloud nodes; and relocating, by the IMS, the at least one network function to the one or more other O-Cloud nodes.

14. The method as claimed in claim 13, wherein the method comprises:

upon implementation of the reconfiguration on the at least one O-Cloud node, relocating, by the IMS, the at least one network function from the one or more other O-Cloud nodes back to the at least one reconfigured O-Cloud node.

15. A non-transitory computer-readable recording medium having recorded thereon instructions executable by at least one processor configured to perform a method for implementing reconfiguration procedure of one or more open cloud (O-Cloud) nodes within a O-Cloud infrastructure of an open radio access network (O-RAN), the method comprising:

obtaining, by a federated O-Cloud orchestration and management (FOCOM) within a service management orchestration (SMO) framework, a request to reconfigure at least one O-Cloud node hosting at least one network function of the O-RAN;

sending, by the FOCOM, a reconfiguration request for the at least one O-Cloud node to the O-Cloud infrastructure via an O2 interface to an infrastructure management services (IMS);and upon implementation of the reconfiguration, receiving, by the FOCOM, a confirmation of the reconfiguration implementation from the IMS via the O2 interface, wherein the method further comprises determining, by the FOCOM, in which sequence the reconfiguration of the at least one O-Cloud nodes is performed, based on performance data of the at least one O-Cloud nodes, and wherein based on determining that the reconfiguration has not been successful, the FOCOM controls to configure the at least one O-Cloud node back to a configuration prior to the reconfiguration request.

16. The non-transitory computer-readable recording medium as claimed in claim 15, wherein the method comprises:

monitoring, by a non-real time radio intelligent controller (NRT-RIC), at least one of O-Cloud data received over the O2 interface and network function data received over an O1 interface;

analyzing, by the NRT-RIC, the at least one of the O-Cloud data and the network function data and, based on the analysis, determine the at least one O-Cloud node to be reconfigured within the O-Cloud infrastructure;

sending, by the NRT-RIC, the reconfiguration request for the at least one O-Cloud node to the FOCOM based on the analyzing.

17. The non-transitory computer-readable recording medium as claimed in claim 15, wherein the method comprises:

determining, by the IMS, to relocate the at least one network function from the at least one O-Cloud node to be reconfigured to one or more other O-Cloud nodes; and relocating, by the IMS, the at least one network function to the one or more other O-Cloud nodes.

18. The non-transitory computer-readable recording medium as claimed in claim 17, wherein the method comprises:

upon implementation of the reconfiguration on the at least one O-Cloud node, relocating, by the IMS, the at least one network function from the one or more other O-Cloud nodes back to the at least one reconfigured O-Cloud node.

* * * * *